Jan. 1, 1935.  B. SCHWARZ  1,986,368

INDUCTION MOTOR WINDING

Filed March 30, 1931

Inventor:

Patented Jan. 1, 1935

1,986,368

UNITED STATES PATENT OFFICE 1,986,368

INDUCTION MOTOR WINDING

Benno Schwarz, Rheydt, Germany

Application March 30, 1931, Serial No. 526,472
In Germany January 23, 1929

4 Claims. (Cl. 172—120)

This invention relates to improvements in induction motors which have two systems of windings on the secondary member or rotor, motors of this type being known in the art as Boucherot motors.

According to the invention a squirrel cage winding of high ohmic and low inductive resistance is located in the slots of the secondary member which are near the surface thereof while a second winding consisting of conductors and connectors between each pair of conductors is provided in slots, the end connectors being only electrically insulated from each other on one side of the rotor and the slots receiving the second winding lying completely below the slots of the squirrel cage winding.

It is thus possible to obtain a sufficiently great reactance of the working winding and to make the construction of this winding very simple because on one side of the rotor the end connectors need not be insulated from each other, that is to say, they may consist in short-circuit rings.

In the accompanying drawing wherein the invention is diagrammatically illustrated:

Figs. 2b, 2c and 2d are diagrammatic views of modifications of the winding illustrated in Fig. 2a.

Figure 1:
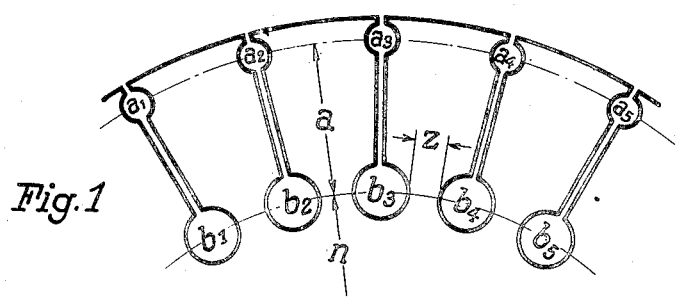
Figure 1 is a diagrammatic view of the rotor of the known type of induction motor including two squirrel cage windings.

Referring to the drawing in detail, Fig. 1, as stated, illustrates the known type of rotor in which is shown the two rows of slots $a1, a2, a3 \ldots$ and $b1, b2, b3 \ldots$, each of which has a squirrel-cage winding. This known construction results in a relatively small radius of the inner squirrel-cage winding $r1$ and a relatively great distance $a$ of the inner slots from the outer slots in order to obtain for the squirrel-cage winding in the inner slots a sufficiently great leakage and a sufficiently high inductive resistance. This high inductive resistance is necessary for obtaining, when starting the motor, a sufficiently high apparent resistance of both windings. The first winding (in the slots $a$) does not render any assistance for that purpose because for other reasons it must be dimensioned for high ohmic and low inductive resistance.

Owing to the low position of the slots $b$, the dimension of the teeth $z$ between the inner slots is very small and consequently high saturations of the teeth result therefrom. The consequence of these high saturations of the teeth is an increase of the magnetization current and a deterioration of the power or output factor and the slip of the motor.

In order to further improve the starting and working properties of such induction motors, it is also already known to use a short-circuited coil winding instead of a squirrel-cage winding. However, this winding was distributed in the two systems of slots so that parts of the same winding were located in the upper slots as well as in the inner slots and both rows of slots were completely filled up by this distributed winding. It was, therefore, necessary to provide the squirrel-cage winding between the slots of the upper row.

Now the construction had the drawback that the teeth became too narrow by providing the squirrel-cage winding in the slots between the slots of the coil winding. It had also the drawbacks of the first construction. It is, however, difficult to make the reactance of the coil winding sufficiently high because those parts of the distributed winding which are located in the upper slots contribute practically nothing towards the reactance and this reactance mainly results from the dimensioning of the lower slots.

In contradistinction thereto, the present invention constitutes an essential advancement. According to the invention, a squirrel-cage winding of high ohmic and low inductive resistance is located in slots near the surface of the rotor; a second winding which consists of conductors and end connectors between each pair of conductors is provided in slots, while the end connectors are only electrically insulated from each other on one side of the rotor and the said slots lie completely below the slots of the squirrel-cage winding.

It is only thereby possible to obtain a sufficiently great reactance of the working winding and to make the construction or design of this winding very simple because on one side of the rotor the end connectors need not be insulated from each other, that is to say, they may consist in short-circuit rings.

The invention as illustrated in Figures 2, 2a, 2b, and 2c and Fig. 2 shows diagrammatically the winding in the inner slots.

Figure 2:
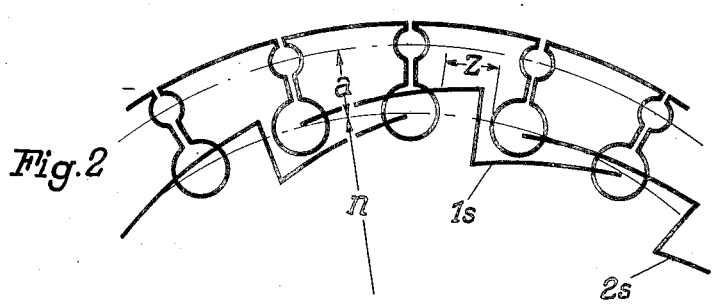
Fig. 2 is a similar view of the construction according to the present invention.
Figure 2A:
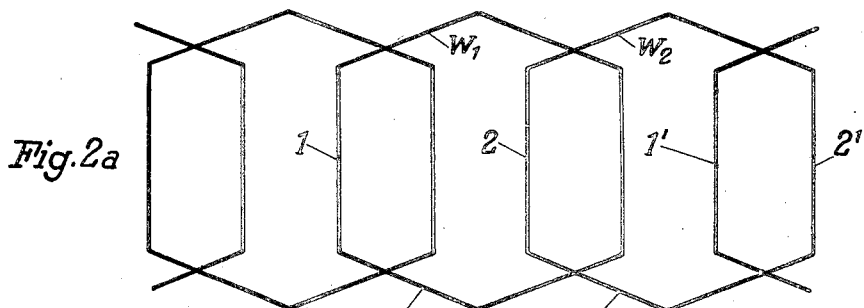
Fig. 2a is a view of the winding of the rotor according to Fig. 2, developed in plan.

The winding shown in Figure 2a consists of short-circuited turns $w1, w2$. Each turn consists of the bars $1, 1' \ldots 2, 2'$, which have corresponding end connectors $1s, 2s$. According to Figure 2, such a winding is located in the lower slot system of the rotor. A squirrel-cage winding of high ohmic and low inductive resistance is located in the upper system.

In comparing this construction with that of Fig. 1, it will be seen that the depth $a$ of the slots has become considerably smaller than before and consequently the value $r1$ has become smaller and the value $z$ has become greater than before. The required reactance of the inner winding is obtained with the construction according to Figure 2 in that the said winding consists of short-circuited turns. According to "Arnold, Die Wechselstromtechnik, volume V/1,1909, page 54 etc.," the reactance—reduced to the primary circuit—of a secondary winding consisting of turns is considerably greater than the reactance of an analogous squirrel-cage winding. Since, therefore, the winding of Figure 2a has a considerably greater reactance than the squirrel-cage winding in the slots $b$ of Figure 1, the position of the inner slots need not be so low in a system according to Figure 2.

If the ohmic and inductive resistances of both windings are properly selected, the current and the torque respectively, which are short-circuited, can thereby be adjusted to a large extent.

Figure 2C:
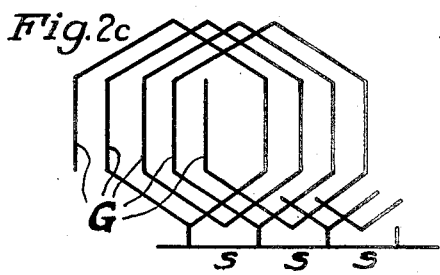
Figure 2D:
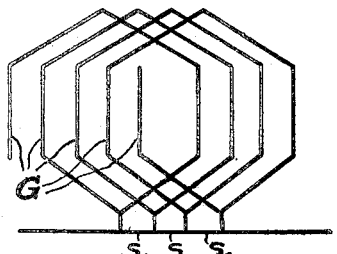
Figure 2B:
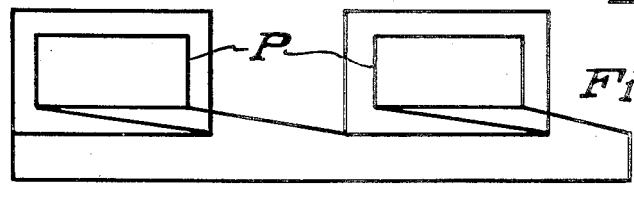

Figures 2b, 2c and 2d show various possibilities of designing the working winding provided in the inner slots.

According to Fig. 2b it is possible to design this winding as a short-circuited phase winding, the groups of turns P being short-circuited per se. The single groups of windings may also be made with several slots per pole and phase.

According to Fig. 2c, the winding consists of coils after the manner of a direct current winding (G) which is short-circuited. The winding factor may be influenced by making a number of connections $s$.

Instead of these connections, all ends of coils may be connected together on one side of the rotor by a short-circuit ring $s1$ as shown in Fig. 2d.

Having thus described my invention, I claim as new and desire to secure by Letters Patent:

1. In combination with the secondary member of an induction motor, two systems of slots, the first system near the periphery of the rotor, all slots of the second system being located below the slots of the first system, a cage winding of high ohmic and low inductive resistance in the first system of slots, a phase winding with a number of slots per pole and phase in the second system, the said phase winding being short-circuited.

2. In combination with the secondary member of an induction motor, two systems of slots, the first system near the periphery of the rotor, the second system at a greater distance than the first system from the periphery of the rotor, a cage winding of high ohmic and low inductive resistance in the first system of slots, a coil winding of low ohmic and high inductive resistance in the second system, the said coil winding having short-circuiting rings located on only one side of said induction motor.

3. In combination with the secondary member of an induction motor, two systems of windings in slots, the slots of the first system being near the periphery of the rotor, all slots of the second system completely below the slots of the first system, the first system of winding consisting of a squirrel-cage winding of high ohmic and low inductive resistance, the second system of winding consisting of a winding of low ohmic and high inductive resistance, the said second winding consisting of conductors and end connectors, which latter are insulated from each other at least on one side of the secondary member.

4. In combination with the secondary member of an induction motor, two systems of windings and slots, the slots of the first system being near the periphery of the rotor, all slots of the second system completely below the slots of the first system, the first winding consisting of a squirrel-cage winding of high ohmic and low inductive resistance, the second winding being of low ohmic and high inductive resistance and designed as direct current winding which is short-circuited and provided with any number of short-circuit connections between single ends of the coils.

BENNO SCHWARZ.